United States Patent
Robins et al.

[11] Patent Number: 5,865,462
[45] Date of Patent: Feb. 2, 1999

[54] INFLATABLE RESTRAINT FOR A VEHICLE OCCUPANT

[75] Inventors: Stephen Leonard Robins, Shipston on Stour; David James Cundill, Leichester, both of Great Britain

[73] Assignee: Breed Automotive Technology, Inc., Lakeland, Fla.

[21] Appl. No.: 933,021

[22] Filed: Sep. 18, 1997

[30] Foreign Application Priority Data

Sep. 19, 1996 [GB] United Kingdom .................... 9619613

[51] Int. Cl.⁶ ............................ B60R 21/08; B60R 21/22
[52] U.S. Cl. ........................................ 280/730.2; 280/749
[58] Field of Search ........................... 280/730.2, 730.1, 280/743.1, 749, 753

[56] References Cited

U.S. PATENT DOCUMENTS

| | | | |
|---|---|---|---|
| 5,462,308 | 10/1995 | Seki et al. | 280/730.2 |
| 5,480,181 | 1/1996 | Bark et al. | 280/730.2 |
| 5,588,672 | 12/1996 | Karlow et al. | 280/730.2 |
| 5,605,346 | 2/1997 | Cheung et al. | 280/730.2 |
| 5,707,075 | 1/1998 | Kraft et al. | 280/730.2 |
| 5,752,713 | 5/1998 | Matsuura et al. | 280/730.2 |
| 5,755,457 | 5/1998 | Specht | 280/730.2 |
| 5,788,270 | 8/1998 | Haland et al. | 280/730.2 |

FOREIGN PATENT DOCUMENTS

| | | |
|---|---|---|
| 590518 | 6/1994 | European Pat. Off. |
| 2122189 | 8/1972 | France |
| 4337656 | 5/1995 | Germany |
| 2951737 | 4/1996 | Germany |
| 2961548 | 2/1997 | Germany |
| 2970497 | 8/1997 | Germany |
| 2261636 | 5/1993 | United Kingdom |
| 9309977 | 5/1993 | WIPO |

Primary Examiner—Paul N. Dickson
Attorney, Agent, or Firm—L. R. Drayer

[57] ABSTRACT

A restraint comprises an inflatable curtain and a deployment member. The deployment member can be an inflatable tube within a braided tube or an elastic member. The deployment member is attached to the inflatable curtain and on receipt of a signal the member deploys the curtain into an occupant protection position in the event of a crash. The restraint is particularly intended for location on one side of a vehicle to provide protection against side impacts.

12 Claims, 15 Drawing Sheets

INFLATABLE RESTRAINT FOR A VEHICLE OCCUPANT

BACKGROUND OF THE INVENTION

The present invention relates to an inflatable restraint for a vehicle occupant.

Airbags are increasingly fitted as standard equipment on production vehicles in the U.S. and in the European market. An airbag mounted on a steering column to protect the driver and an airbag mounted in the dashboard to protect the passenger is a typical arrangement for providing occupant protection in the event of a front end collision. In a typical airbag system a sensor is strategically placed on the vehicle and operation of the sensor is arranged to fire a pyrotechnic gas generator to inflate the airbag.

Side airbag protection systems are also known which protect the driver/passenger in the event of a side impact.

One such side airbag protection system is disclosed in U.S. Pat. No. 5480181. That document discloses a braided tubular bag which is arranged to contract longitudinally as the diameter of the tube increases. In a deflated state the tube is arranged along the door pillar and the roof rail of the vehicle. In the event of an impact the tube is inflated by a gas generator. The tube contracts longitudinally and forms a taut semi-rigid structural member across the vehicle side window. However, that system provides little protection against ingress of broken glass from the window and other foreign bodies. Also, the inflated tube is relatively rigid and may not, therefore, provide the most desirable form of cushioning for the driver or passenger whose head impacts the tube.

U.S. Pat. No. 5,660,414 teaches a side impact restraint system having a deployment mechanism that includes a gas generator, a track and a projectile that slides in the track.

According to a first aspect of the invention there is provided an inflatable restraint for a vehicle occupant comprising an inflatable curtain, and a deployment member for moving the curtain into an occupant protection position. By using such an inflatable curtain, improved occupant cushioning can be achieved thereby reducing injury to a driver or passenger but without sacrificing deployment speed. Inflating means may be provided to inflate the curtain.

The deployment member may be elongate and preferably contracts longitudinally to deploy the curtain. The deployment member may be a flexible member for convenient stowage in the vehicle. The deployment member may itself be inflatable and, in such a case, may comprise a tube. The tube may comprise an outer tube enclosing a gas impermeable tube, the gas impermeable tube being connected, in use, to said inflating means. The outer tube may be braided whereby, upon inflation, the tube increases in diameter and contracts longitudinally so as to deploy the curtain.

In another embodiment the deployment member may be a resilient member. In such a case, the resilient member may be held in an extended state under tension when the inflatable curtain is in its undeployed state and the resilient deployment member may be released so as to deploy the curtain. The resilient member may be held under tension by a latch. The latch may be actuated by a solenoid. The solenoid may be operable by a pressure sensor connected to the inflating means. Alternatively, the solenoid may be operable on receipt of a signal, said signal also initiating the inflating means.

According to a second aspect of the invention there is provided a vehicle having therein an inflatable restraint according to the first aspect of the invention or any of the consistory clauses relating thereto. The curtain is preferably located inside the vehicle to one side thereof. The curtain may be located along one whole side of the vehicle. Alternatively, one curtain may be located at the front of the vehicle and another curtain may be located at the rear. The front and rear curtains may overlap. The curtain may be located in a slot in a roof rail of the vehicle and/or in a slot in the door pillar of the vehicle.

DETAILED DESCRIPTION OF THE INVENTION

Figure 1A:
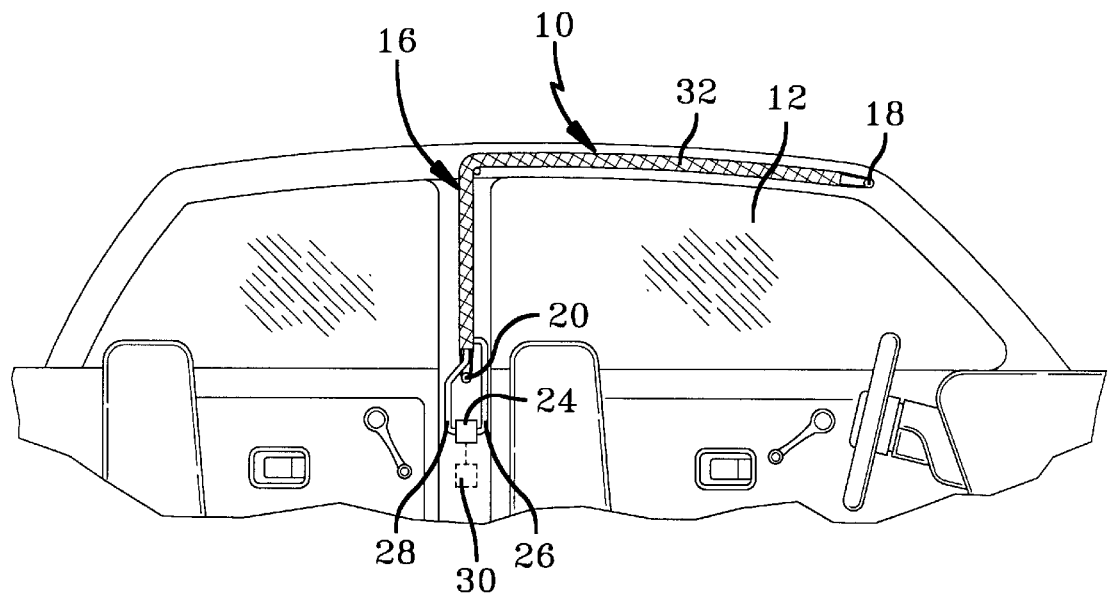
FIG. 1a is an elevation of a restraint in accordance with the first aspect of the invention, in the undeployed state.
Figure 1B:
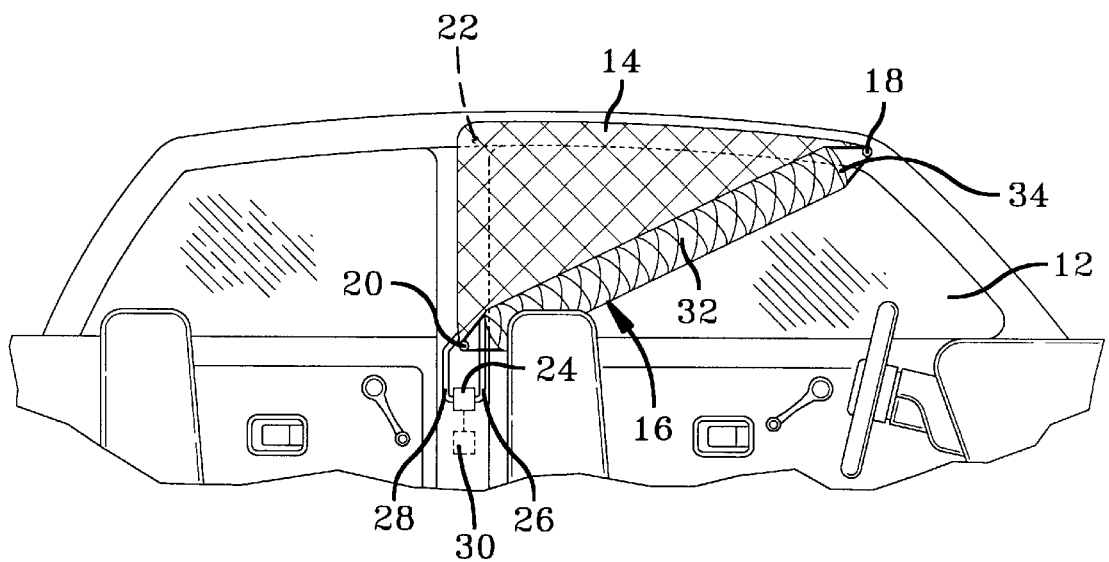
FIG. 1b is a view similar to FIG. 1a with the restraint in the deployed state.

In FIGS. 1a and 1b a restraint 10 is located adjacent a vehicle side window 12. The restraint 10 comprises a generally triangular inflatable curtain 14 (see FIG. 1b) with a braided tube deployment member 16 connected to the curtain 14 along a lower edge thereof. The curtain 14 is hollow with opposite triangular faces sealed around their edges to each other. The term "inflatable curtain" is intended to cover any sheet-like member, at least part of which may be inflated. Thus all of the arrangements shown in FIG. 18 are encompassed by the term "inflatable curtain".

The deployment member 16 is mounted to the vehicle at spaced mounting points 18, 20. The mounting point 18 is located adjacent the forward upper corner of the window 12 and the mounting point 20 is located adjacent the rearward lower corner of the window 12. The curtain 14 is secured to the vehicle at mounting point 22 which is located adjacent the rearward upper corner of the window 12 such that the curtain is arranged around the perimeter of the window in the undeployed state.

A source of gas under pressure such as a gas generator 24 is connected by pipes 26, 28 to the curtain 14 and the deployment member 16 respectively.

The gas generator 24 is electrically connected to a crash sensor 30 which is arranged to sense impact of the vehicle with an obstruction in the region of the restraint.

The braided tube deployment member 16 comprises a braided tube 32 enclosing a gas impermeable tube 34 connected to the pipe 28 of the gas generator 24.

FIG. 1a shows the restraint in an undeployed state. In its undeployed state the deployment member 16 is arranged in a recess (not shown) which runs along the top of the window 12 and down the rear side of the window 12. The curtain 14 is deflated and furled in the recess. The curtain 14 is folded in such a manner that, on deployment, it exits the recess quickly for inflation.

On sensing a crash, the crash sensor 30 actuates the gas generator 24. The gas generator 24 includes an explosive substance which, on exploding, produces large volumes of gas very quickly. In the present case the generator produces approximately 20 liters of gas in about ten milliseconds. The gas generator 24 inflates the gas impermeable tube 34 via pipe 28. On inflation, the impermeable tube 34 increases in diameter which, in turn, increases the diameter of the braided tube 32. The increase in diameter of the braided tube 32 causes the tube 32 to contract longitudinally. That contraction causes the deployment member 16 to snap out of the recess to a position taught between the mounting points 18, 20 in the manner of a bow string. The deployment member 16 pulls the curtain 14 from the recess and the curtain 14 is inflated with gas from the generator 24 via pipe 26.

Thus, the restraint 10 can be used in a situation where deployment time is limited, for instance in a side impact. The deployment member 16 ensures that the curtain is deployed quickly and the curtain 14 provides a useful restraint which reduces the risk of injury to vehicle occupants and protects against ingress of broken glass and foreign bodies.

Figure 2A:
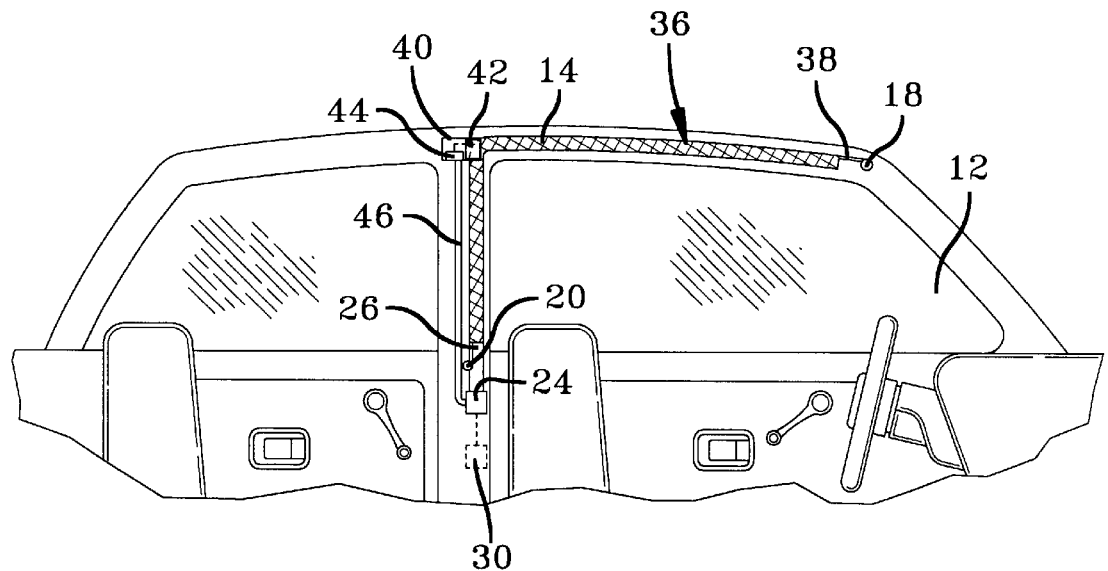
FIG. 2a is an elevation of a further restraint in accordance with the first aspect of the invention in the undeployed state.
Figure 2B:
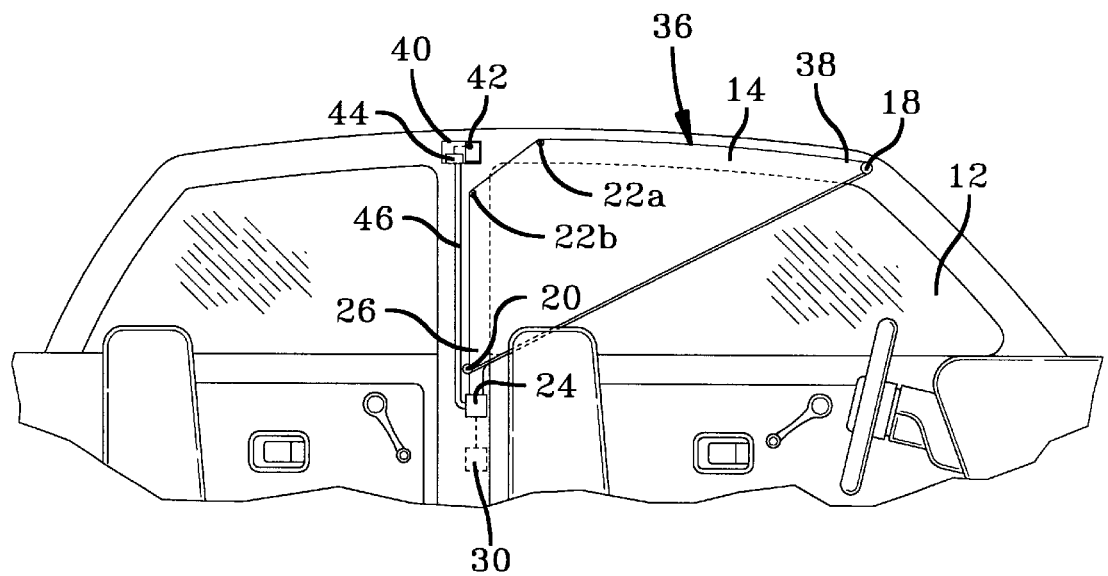
FIG. 2b is a similar view to FIG. 2a with the restraint in the deployed state.

FIGS. 2a and 2b show another restraint 36 in accordance with the first aspect of the invention. Parts corresponding to parts in FIGS. 1a and 1b carry the same reference numerals.

The restraint 36 comprises a curtain 14 and an elastic deployment member 38.

The curtain 14 is substantially similar to that of FIGS. 1a and 1b except that it is trapezium shaped and is mounted at mounting points 22a, 22b which are spaced diagonally either side of the rear upper corner of the window 12.

The elastic deployment member 38 comprises a length of resilient material, preferably an elastomeric material. The member 38 is mounted at mounting points 18, 20 in similar manner to that shown in FIGS. 1a and 1b. The elastic deployment member is connected along the lower edge of the curtain 14. The elastic deployment member 38 is held under tension in its undeployed state by a latch 40.

The latch 40 comprises a solenoid 42 which is actuated by means of a pressure switch 44. The pressure switch 44 is connected by means of a pipe 46 to the gas generator 24. Alternatively, the solenoid 42 may be actuated by a signal from the crash sensor 30 which also initiates the gas generator 24.

FIG. 2a shows the restraint 36 in an undeployed state. The elastic deployment member 38 extends from the mounting point 18 along the top of the window 12 to the latch 40 and then down the rear side of the window 12 to the mounting point 20. The curtain 14 and deployment member 38 are located in a recess in similar manner to FIGS. 1a and 1b.

As previously, the gas generator 24 is connected to a crash sensor 30. On sensing a crash, the sensor 30 actuates the gas generator 24. Gas is injected into the curtain 14 via the pipe 26 and gas also travels along the pipe 46 to the pressure switch 44. The pressure switch 44 actuates the solenoid 42 to release the elastic deployment member. The elastic deployment member 38 which, in the undeployed state, is held under tension, snaps taught, in the manner of a bow string. The elastic deployment member 38 pulls the curtain 14 from the recess and the curtain is inflated.

FIGS. 3 to 6 show arrangements of inflatable restraints in accordance with the invention in a vehicle.

Figure 3A:
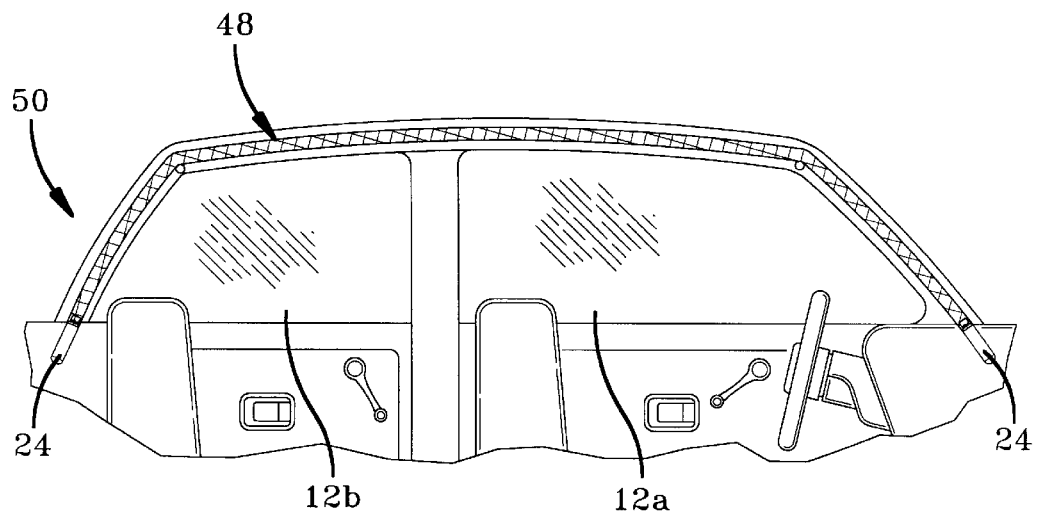
FIGS. 3a and 3b are elevations of a restraint in a vehicle, the restraint extending from the front door pillar to the rear door pillar, in undeployed and deployed states respectively.
Figure 3B:
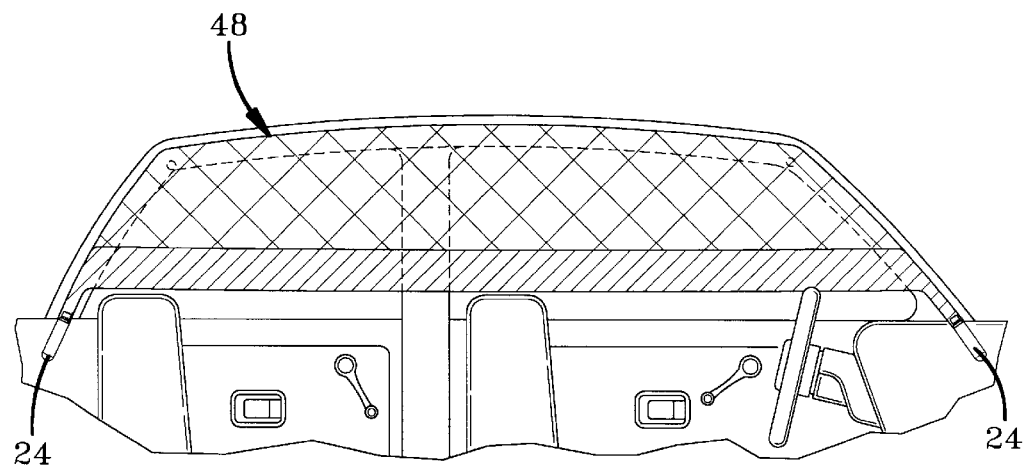

FIGS. 3a and 3b show a restraint 48 which extends from a point adjacent the lower front corner of a driver window 12a of a vehicle 50 to a point adjacent the lower rear corner of the passenger window 12b of the vehicle 50. FIG. 3b shows the restraint 48 of FIG. 3a in a deployed state.

Figure 4A:
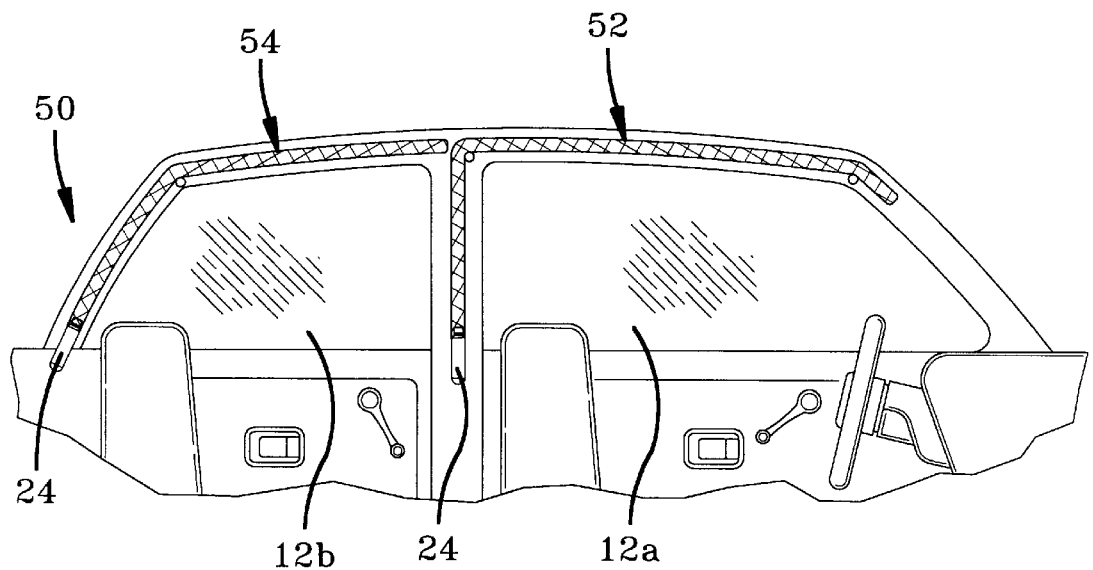
FIGS. 4a and 4b are elevations of separate driver and passenger restraints in a vehicle in accordance with the first aspect of the invention, shown in undeployed and deployed states respectively.
Figure 4B:
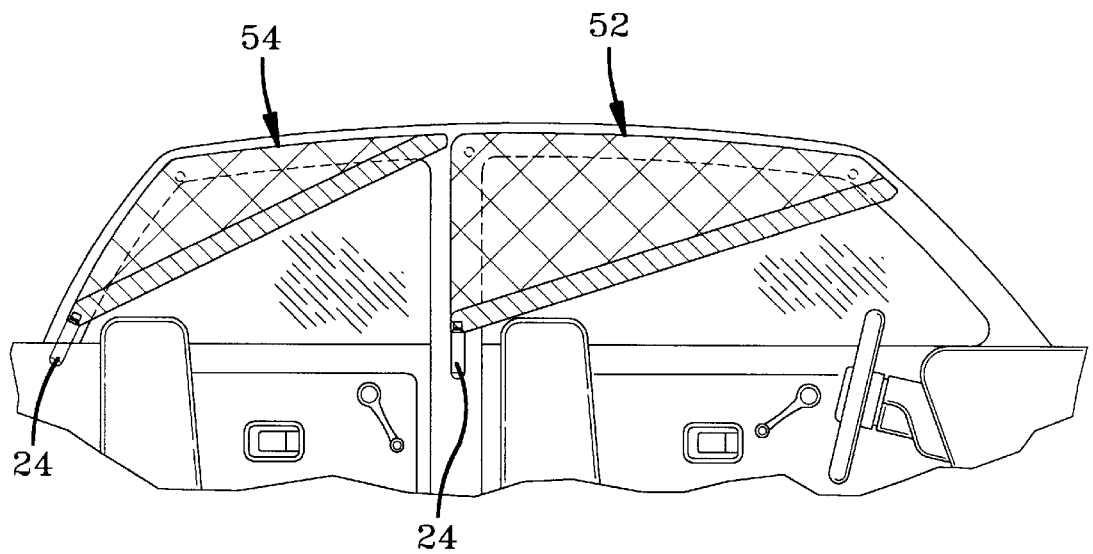

FIG. 4a shows inflatable restraints 52, 54 for driver and passenger windows 12a, 12b respectively. FIG. 4b shows the restraints 52, 54 in a deployed state.

Figure 5A:
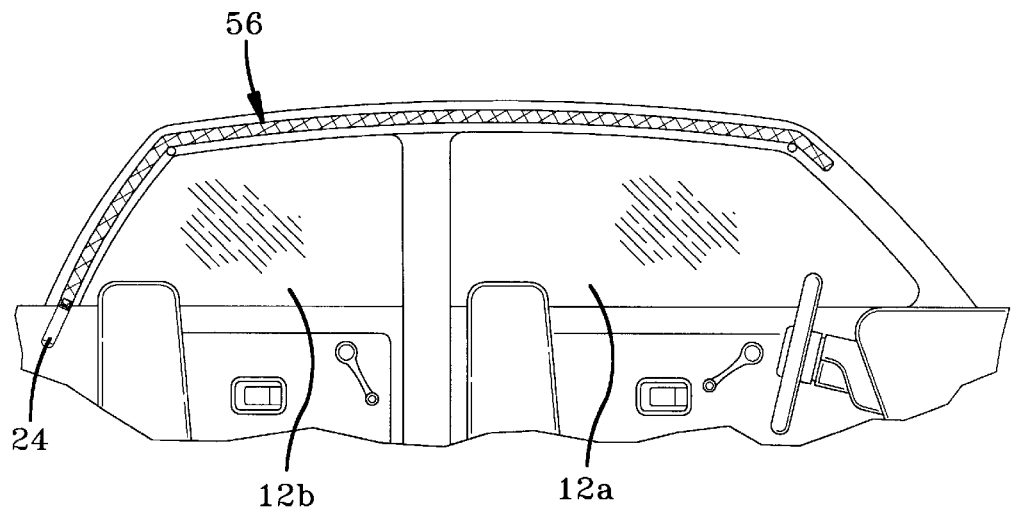
FIGS. 5a and 5b are elevations of another inflatable restraint in a vehicle in accordance with the first aspect of the invention in undeployed and deployed states respectively.
Figure 5B:
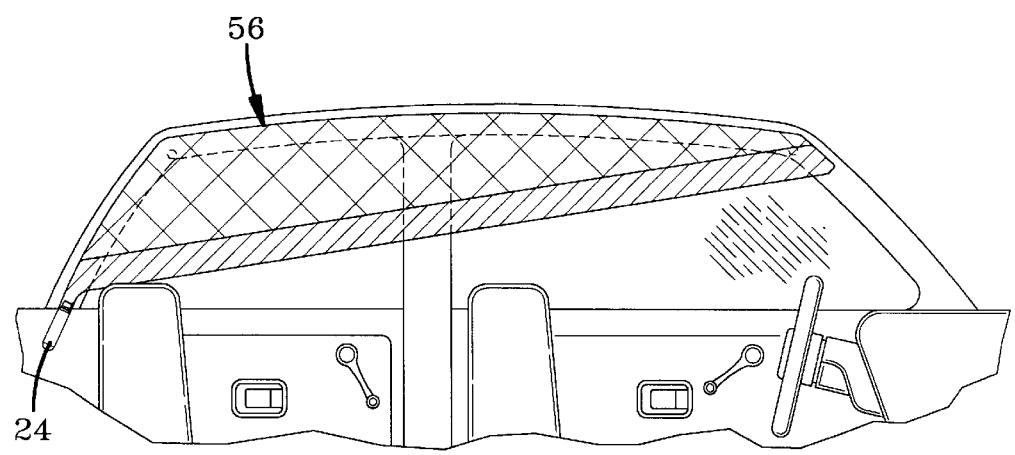

FIG. 5a shows an inflatable restraint 56 in the vehicle 50 which extends from the upper front corner of the driver window 12a to the lower rear corner of the passenger window 12b. FIG. 5b shows the restraint 56 in a deployed state.

Figure 6A:
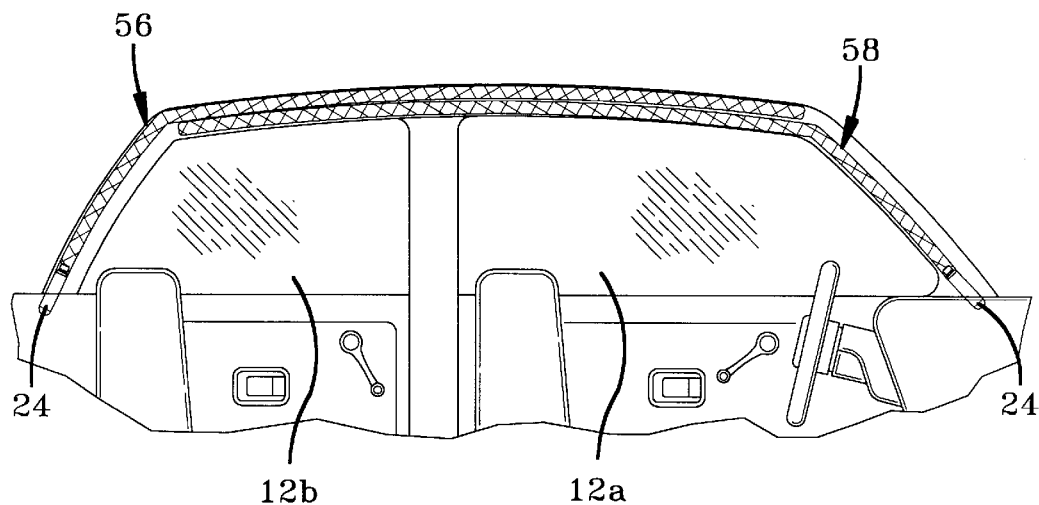
FIGS. 6a and 6b are elevations of two restraints of the kind shown in FIGS. 5a and 5b for a driver and passenger the restraints being shown in undeployed and deployed states respectively.
Figure 6B:
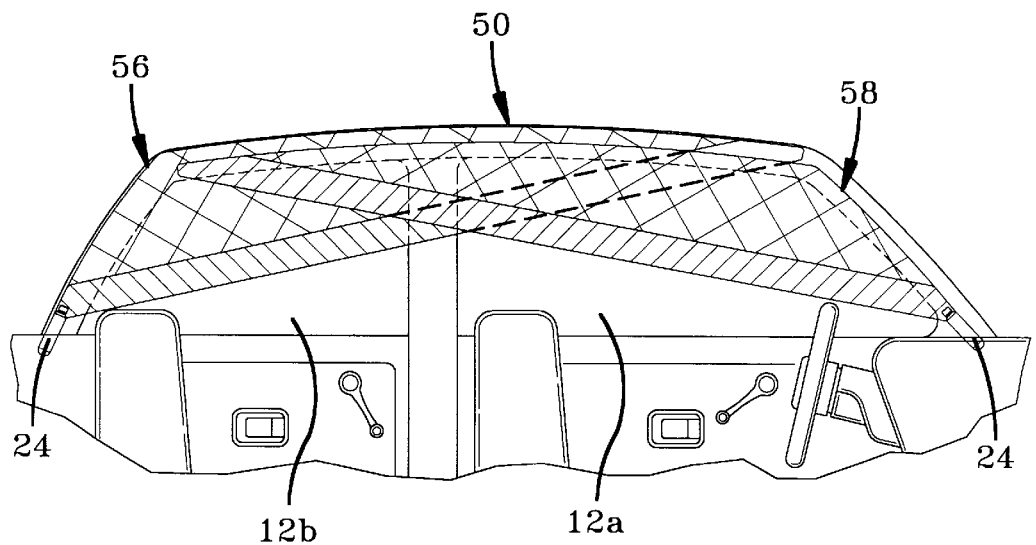

FIG. 6a shows a pair of restraints. The first restraint 56 is similar to that shown in FIGS. 5a and 5b. The second restraint 58 extends from the lower front corner of driver window 12a to the upper rear corner of the passenger window 12b. As can be seen from FIG. 6b, which shows the restraints 56, 58 in their deployed states, the restraints 56, 58 overlap to provide a restraint along the whole side of the vehicle 50.

Figure 7:
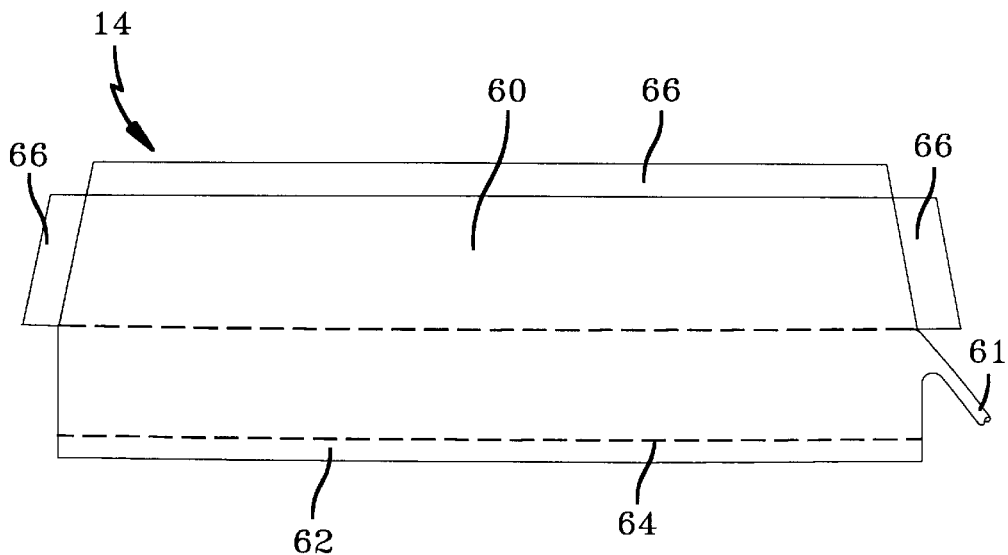
FIG. 7 is an elevation of the curtain part of the restraint shown in FIGS. 3a and 3b in an unfolded state.

FIG. 7 shows a curtain part 14 of a restraint 48 similar to that shown in FIG. 3. The curtain part 14 is shown folded out flat.

The curtain part 14 comprises a substantially trapezium shaped central part 60 which is connected at a corner to a pipe 61. Depending downwardly from the long edge of the trapezium shaped central portion 60 is a rectangular flap 62 which can be folded back on itself along a fold line 64 to form a tube for receiving a deployment member 16, 38.

Mounting member receiving flaps 66 extend from the other edges of the trapezium shaped central portion 60. The flaps 66 are arranged to be folded back on themselves to form a tube to receive mounting members (see FIG. 8).

Figure 8:
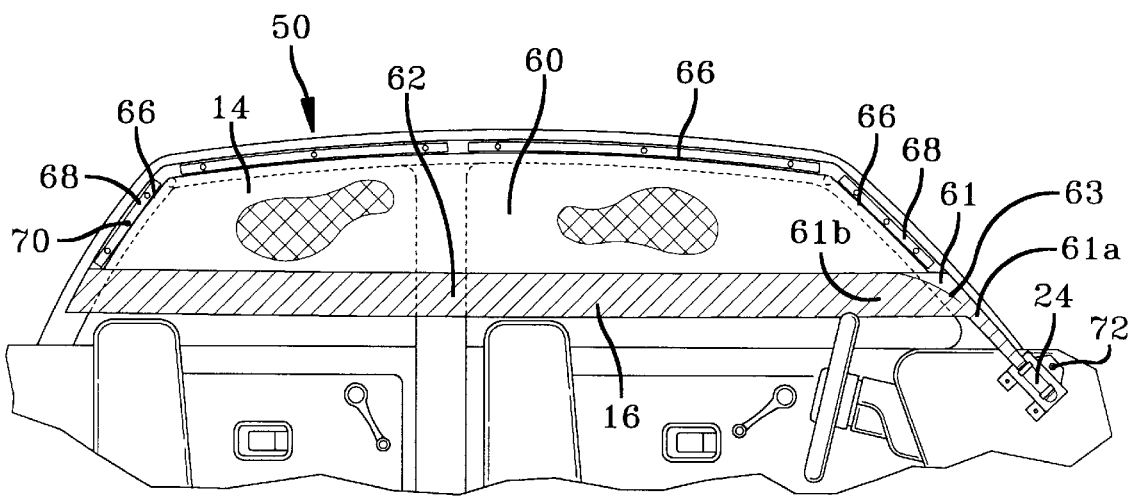
FIG. 8 is an elevation of the curtain part of the restraint of FIGS. 3 and 7.

FIG. 8 shows the curtain part 14 with the flaps 62, 66 shown in their folded positions.

The flaps 66 receive mounting members 68. Each mounting member 68 comprises an elongate metal plate with regularly spaced holes 70 which receive fasteners for fastening the curtain 14 to the vehicle 50. The curtain 14 is shown attached by pipe 61 to a gas generator 24 which is mounted on a gas generator mounting 72. The pipe 61 has a flap 63 therein which divides the pipe 61 into passages 61a, 61b. The passage 61a leads to the interior of the central portion 60. The passage 61b leads to the tube formed by the flap 62 for connection to a braided tube deployment member 16.

Figure 9:
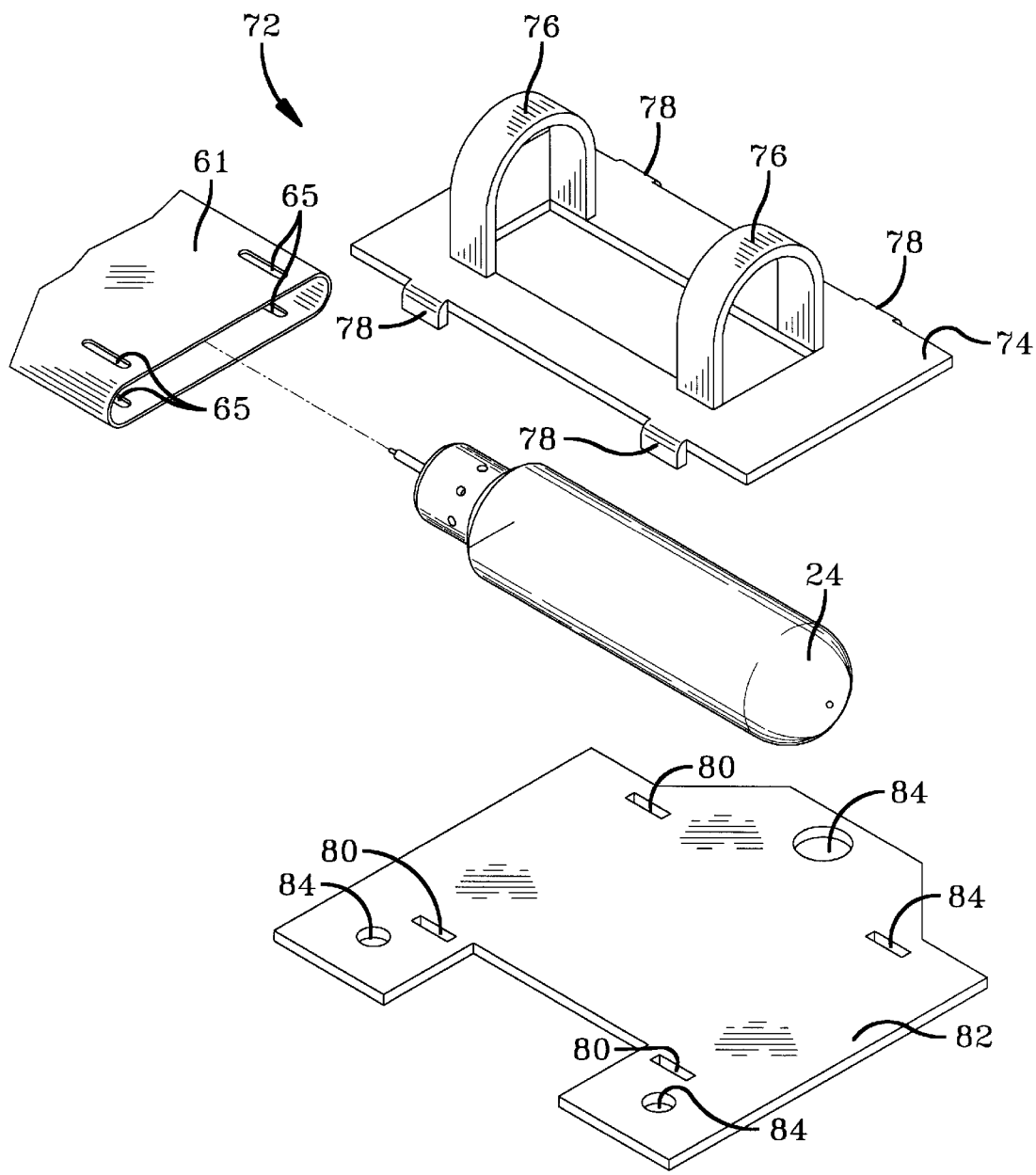
FIG. 9 is an exploded perspective view of the inflating device for use inflating the curtain of FIGS. 3, 7 and 8.

The gas generator mounting 72 is shown in more detail in FIG. 9. The gas generator mounting 72 comprises a bracket 74 with spaced gas generator receiving loops 76 thereon. The bracket 74 has tabs 78 which are received in slots 80 of a gas generator mounting plate 82. The mounting plate 82 has holes 84 for receiving fasteners which fasten the generator mounting 72 to the vehicle 50. On assembly, the gas generator 24 is received in the pipe 61. The bracket is then pushed over the generator 24 which is surrounded by the pipe 61. The loops 76 secure the generator 24 in place. The pipe 61 has apertures 65 therein and the tabs 78 pass through the pipe apertures 65. The bracket 74 is attached to the mounting plate 82 by inserting the tabs 78 through the respective slots 80 and bending the tabs over to secure the bracket 74 to the plate 82. Once assembled, the loops 76 and the plate 82 secure the pipe 61 around the generator 24 in a gas-tight manner. The plate 82 can then be secured to the vehicle by fasteners extending through the holes 84. The gas generator 24 is arranged in fluid communication with the restraint 48 via the pipe 61. The bracket 74 may be fastened to the plate 82 by other fasteners, such as screws (not shown). The fasteners may secure the bracket 74 to the plate 82 and the assembly to the vehicle 50.

Figure 10:
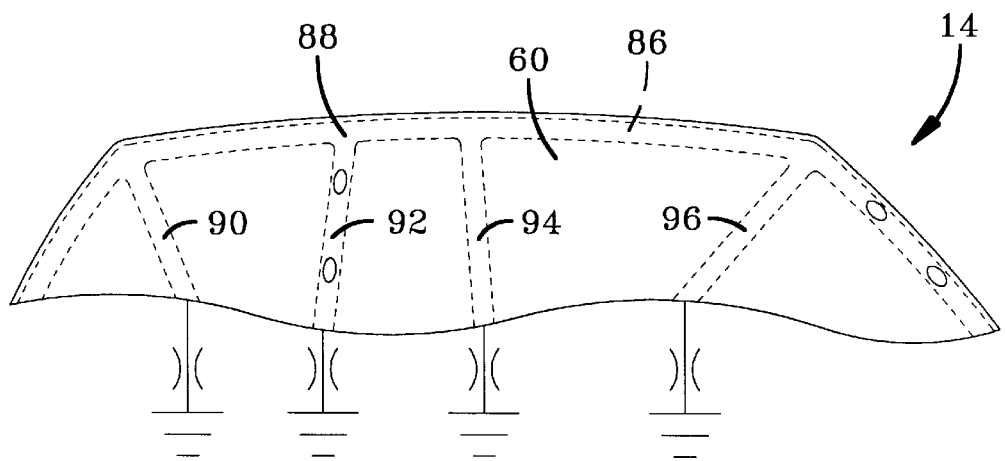
FIG. 10 is an elevation of the curtain part of the restraint of FIGS. 3, 7 and 8 showing the tubular structure inside the curtain.

FIG. 10 shows the central portion 60 of the curtain 14. The central portion 60 has an internal arrangement of tubes 86 which are inflated before the remainder of the central portion 60 to provide the curtain 14 with structural rigidity. The arrangement of tubes comprises a tube 88 which extends around the upper periphery of the portion 60 and four tubes 90, 92, 94, 96 depending downwardly therefrom.

The four tubes 90, 92, 94, 96 vent to atmosphere via restrictors which are represented schematically in FIG. 10. The tube 88 opens to the interior of the curtain. Also vent holes are provided in the tube 88 and the tube 92 which vent to airbags 98 for the heads of vehicle occupants (see FIGS. 11a, 11b). The tubes are preferably arranged, on inflation, to bring the airbags 98 into positions suitable for protecting vehicle occupants, for instance, adjacent a door pillar of the vehicle.

Figure 11A:
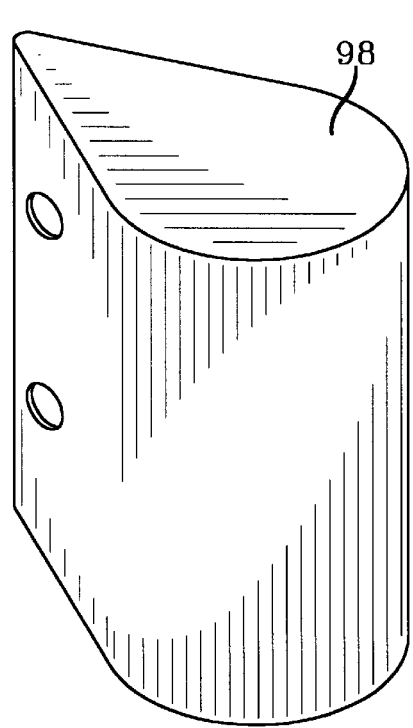
FIGS. 11a and 11b are perspective views of alternative embodiments of head airbag which can be connected to the curtain in fluid communication therewith.
Figure 11B:
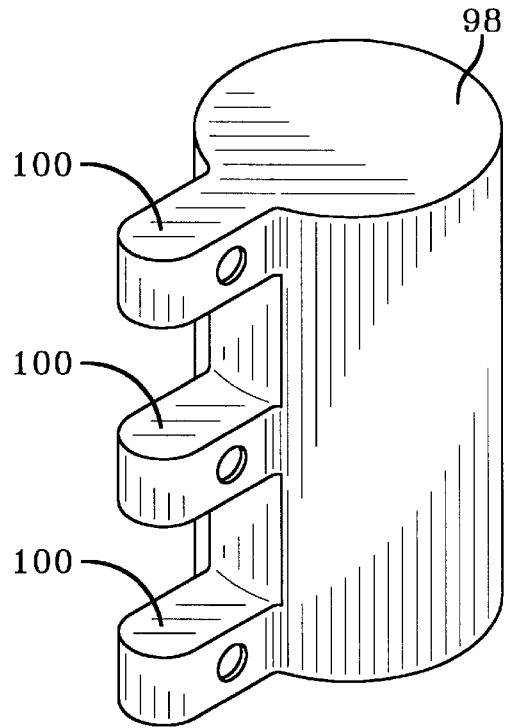

Embodiments of head airbags 98 are shown in FIGS. 11a and 11b. In FIG. 11a the airbag 98 comprises an airbag having two vent holes to allow venting from the curtain 14 to the bag 98. In FIG. 11b the head airbag 98 has three ears 100 protruding therefrom which have vent holes therein and which help to locate the bag, upon inflation.

Figure 12:
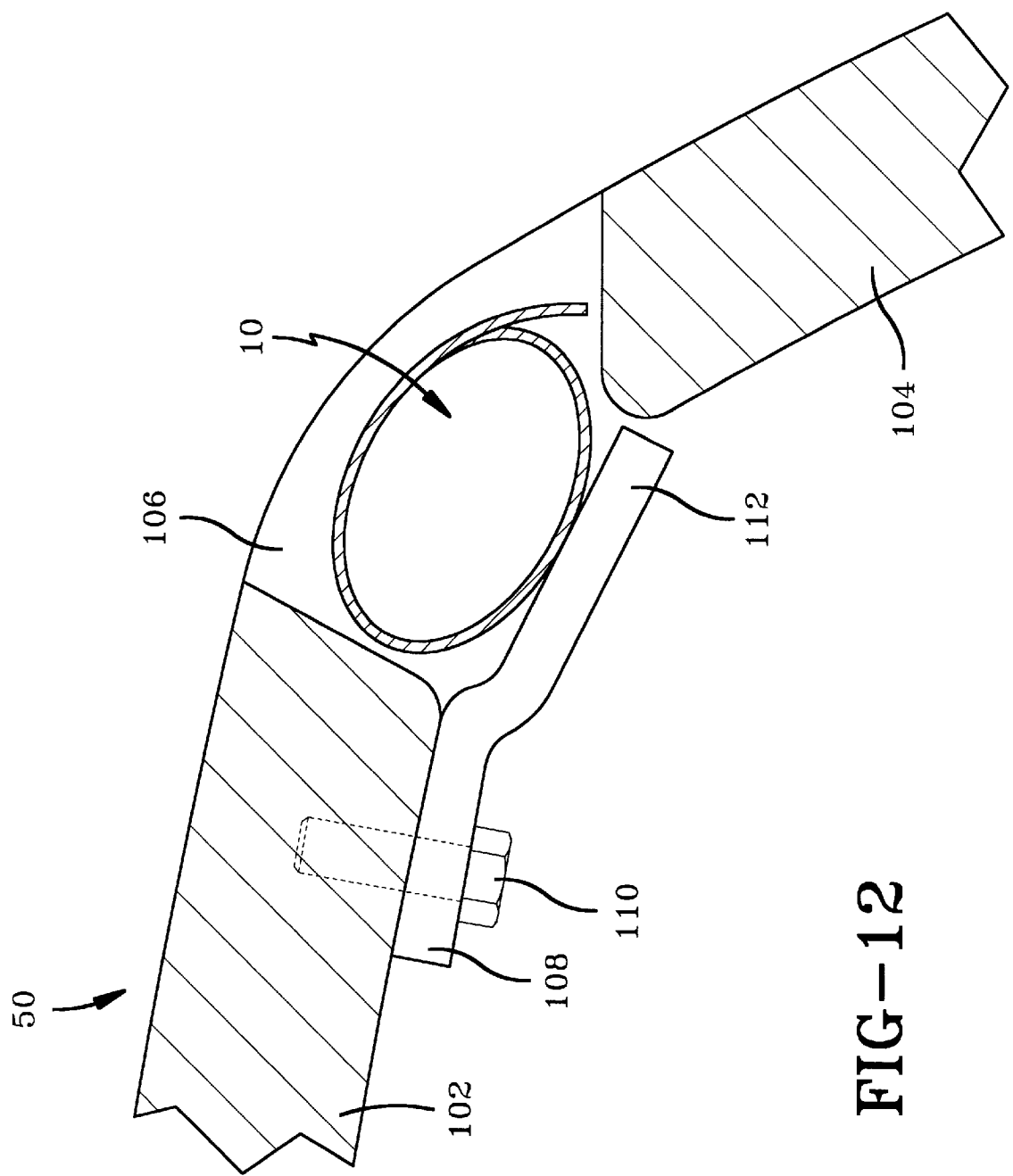
FIG. 12 is a schematic sectional view showing the location of an undeployed restraint in a vehicle.

FIG. 12 is a schematic sectional view of a vehicle 50 showing the location of the restraint 10 in its undeployed state. The vehicle 50 has a ceiling lining 102 and a door pillar 104, defining a recess 106 therebetween. The recess 106 receives the restraint 10 and the restraint is concealed by means of a finisher 108 which is attached to the ceiling liner 102 by means of fastenings 110. The finisher 108 comprises an elongate strip of resilient material 112 which extends across the recess 106 between the ceiling lining 102 and the door pillar 104.

Figure 13A:
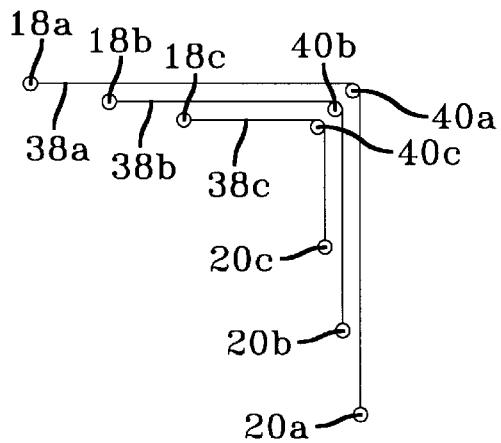
FIGS. 13a and 13b are schematic elevations of a curtain having multiple deployment members in undeployed and deployed states respectively.
Figure 13B:
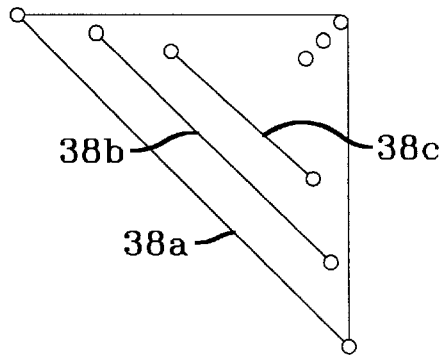

FIGS. 13a and 13b show schematically a restraint in accordance with a first aspect of the invention in which multiple deployment members are used. In that way, the restraint can be deployed even more quickly and the deployment members 38a, 38b, 38c provide additional structural rigidity to the curtain 14 when inflated.

Figure 14A:
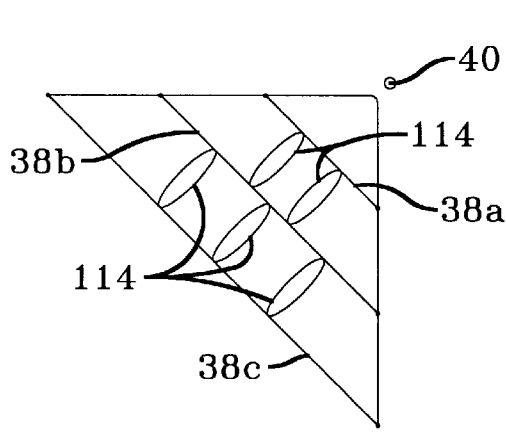
FIGS. 14a and 14b are schematic elevations of curtains in accordance with the first aspect of the invention having multiple deployment members and structural members for strengthening.
Figure 14B:
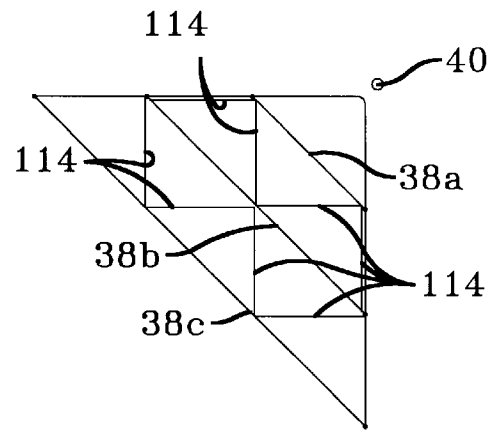

In FIGS. 14a and 14b, additional structural members 114 are provided between the multiple deployment members 38a, 38b, 38c to provide improved rigidity. The structural members 114 are ribs or loops of material which are secured at each end to respective deployment members 38a, 38b, 38c.

Figure 15A:
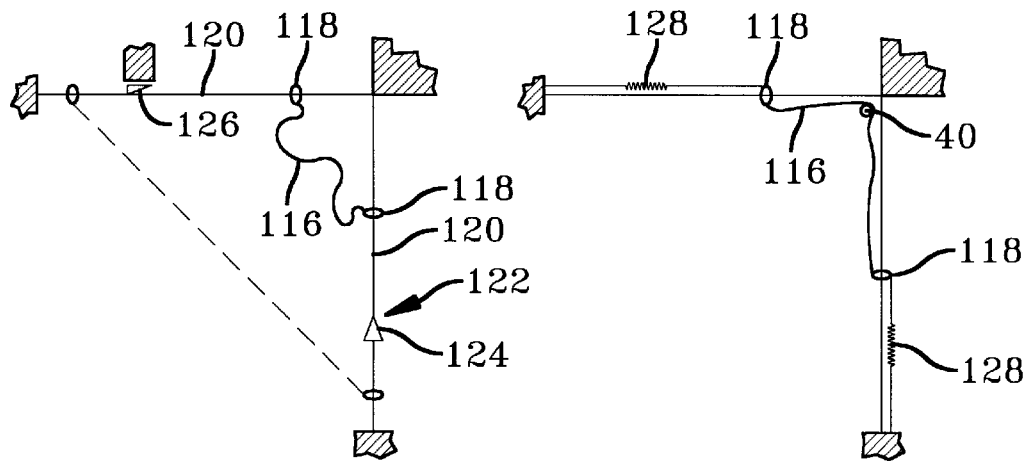
FIGS. 15a and 15b are schematic elevations of an inflatable restraint for a vehicle in accordance with the fourth aspect of the invention.
Figure 15B:
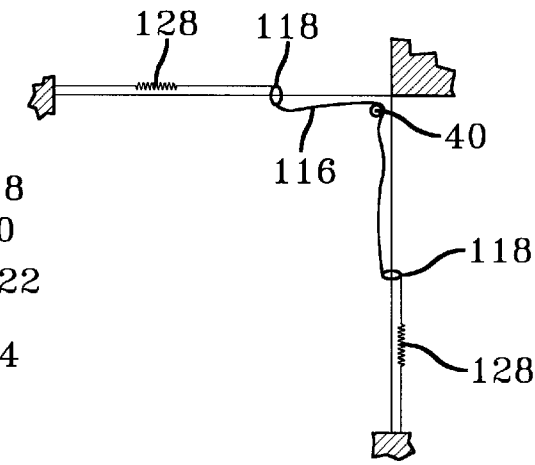

FIGS. 15a and 15b show a restraint in accordance with the fourth aspect of the invention. In FIG. 15a, the restraint comprises a curtain or other airbag (not shown) with a non-extensible flexible member 116 connected thereto. The non-extensible flexible member 116 prevents the bag or curtain from over-inflating or, where a deployment member is used, from extending beyond the deployment position of the restraint. The non-extensible flexible member 116 has loops 118 which run along guide rails 120 which are inclined at 90° to each other. On inflation of the bag the loops 118 run along the guide rails 120 until the non-extensible flexible member 116 is taught. The tautness of the non-extensible flexible member then prevents the restraint from travelling any further. The guide rails may have non-return means 122 thereon. Such non-return means 122 may comprise a conical formation 124 over which the loop 118 can travel in the deployment direction but not in the other. Alternatively, the non return means 122 comprises a wedge 126 which is spring-biased against the rail 120 whereby the loop 118 can pass in the deployment direction past the wedge 126 but not in the opposite direction.

Also, the non-extensible flexible member 116 and/or the deployment member 16, 38 holds the curtain taut in a restraint position for an extended period of time, i.e. a period longer than could be achieved using inflation gas alone. That provides a restraint of particular use in long crash events, e.g. a rollover situation.

FIG. 15b shows another restraint in accordance with the invention with the curtain part omitted for clarity. The deployment member and the non-extensible flexible member may be combined by attaching the loops 118 at the end of the non-extensible flexible member 116 to elastic members 128 which are held under tension in the undeployed state of the restraint. The non-extensible member can be retained by means of a latch 40 in similar manner to the restraint of FIG. 2. Upon deployment, the latch 40 can release the non-extensible flexible member 116 and the elastic members 128 will pull the non-extensible flexible member taut to deploy the restraint.

Figure 16:
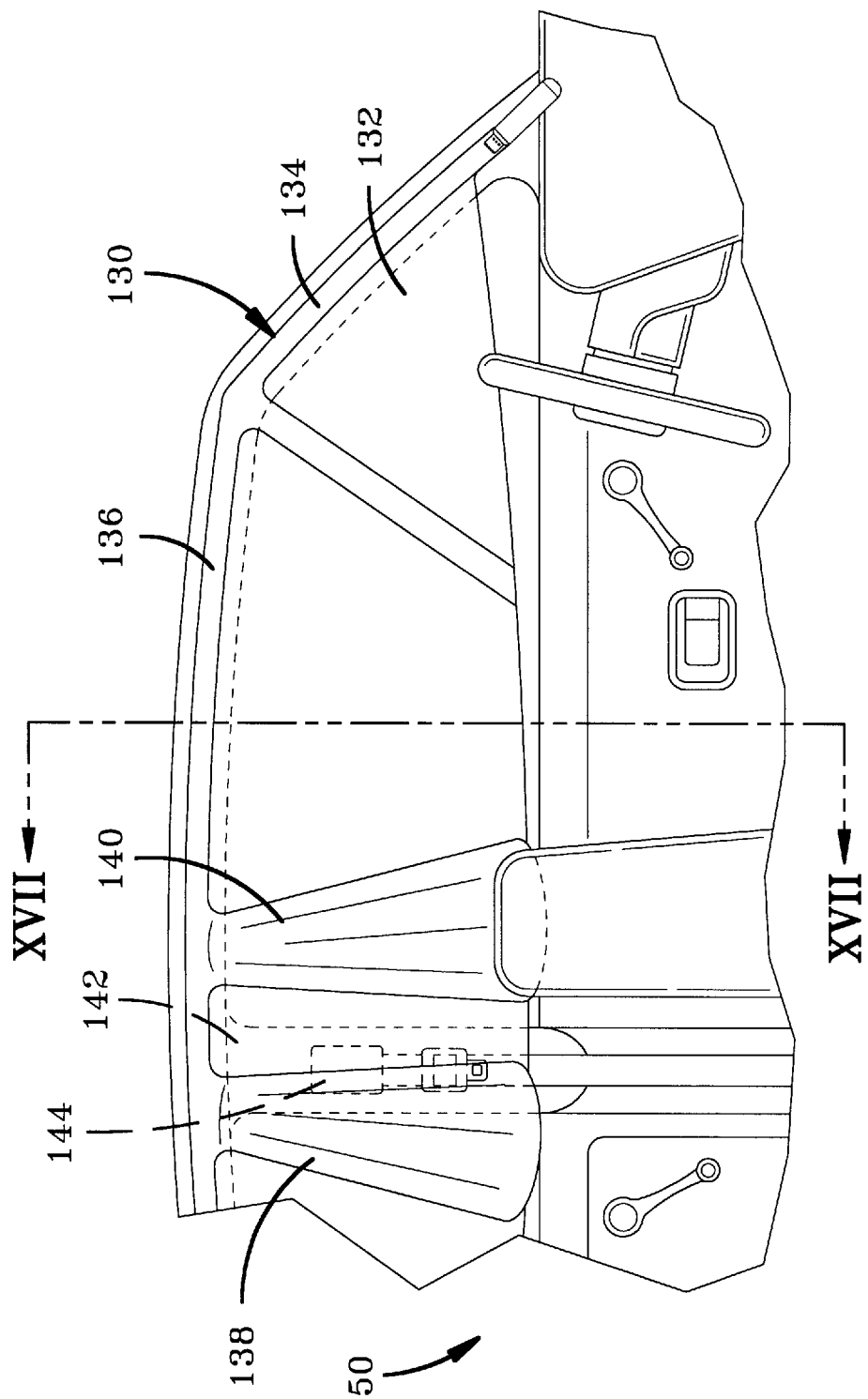
FIG. 16 is an elevation of part of a curtain in accordance with the third aspect of the invention.

FIG. 16 shows part of a restraint in accordance with the third aspect of the invention. The restraint 130 comprises a curtain 132 having an internal tubular arrangement 134, 136, 138, 140 which is similar in many respects to that shown in FIG. 10. The tubular arrangement comprises a tube 136 which extends around the upper periphery of the curtain and four downwardly depending tubes, three of which are shown. The middle two downwardly depending tubes 138, 140 are substantially conical, having their large end towards a lower part of the curtain 132.

When the curtain of FIG. 16 is deployed the conical tubes 138, 140 are filled. The conical tubes 138, 140 act against a door pillar 142 of the vehicle 50. The tubes 138, 140 push the curtain 132 away from the door pillar 142 so as to hold the curtain clear of a seat belt 144 attached to the door pillar 142.

Figure 17:
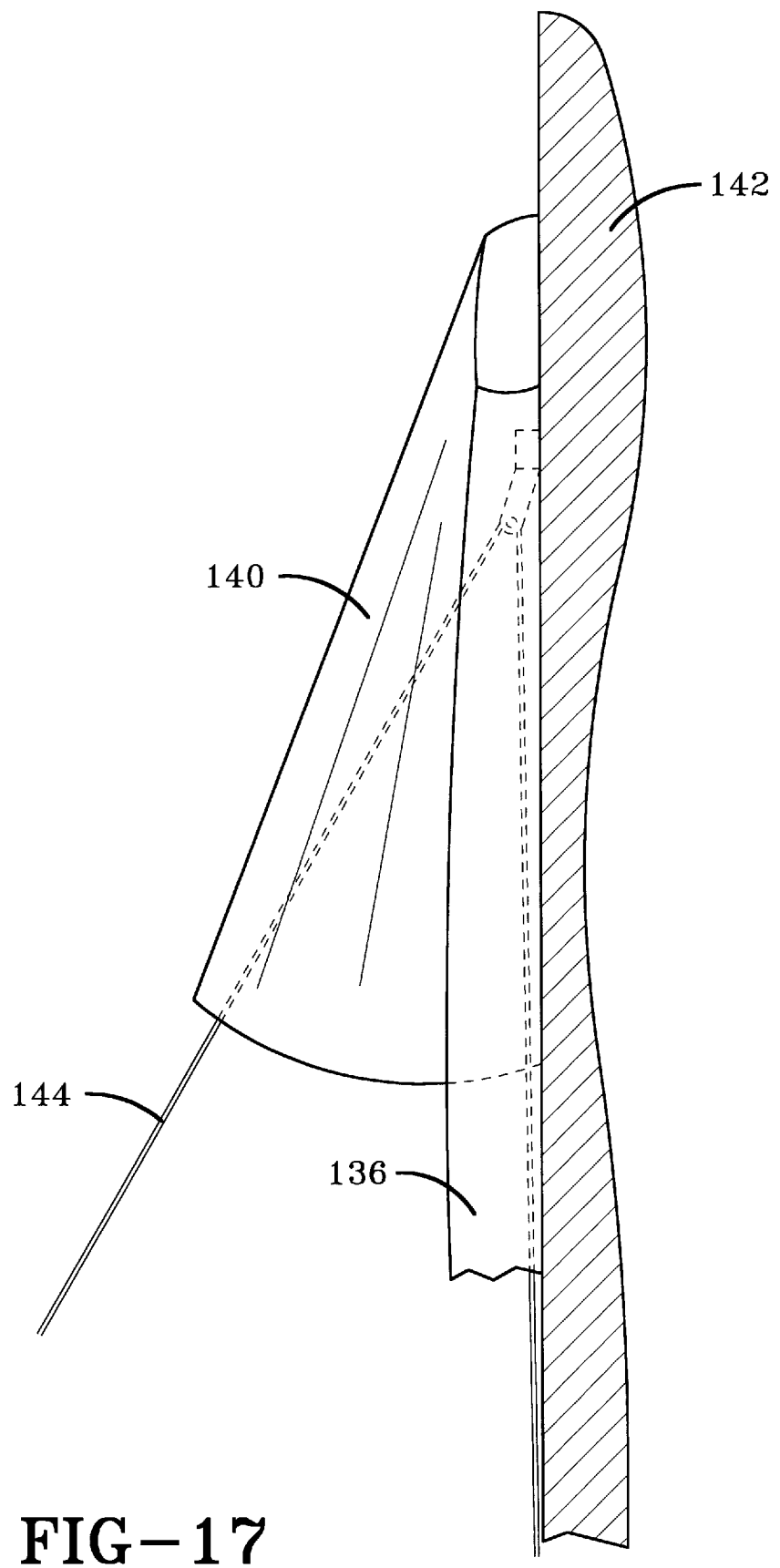
FIG. 17 is an elevation of the curtain of FIG. 16 looking in the direction of arrow XVII in FIG. 16.
Figure 18A:
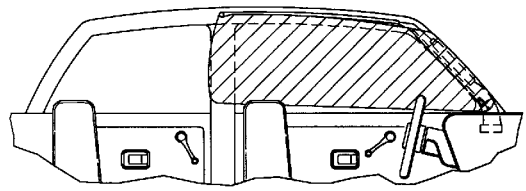
FIG. 18 is a schematic elevation of a plurality of curtain configurations for use in a restraint in accordance with the invention.
Figure 18B:
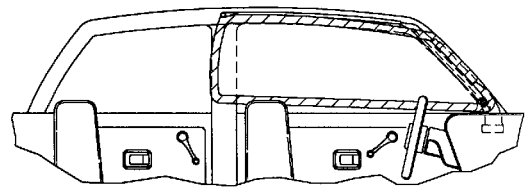
Figure 18C:
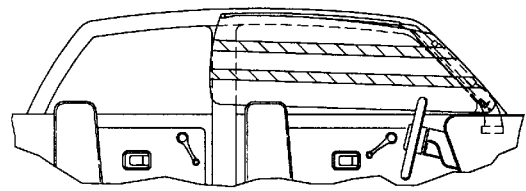
Figure 18D:
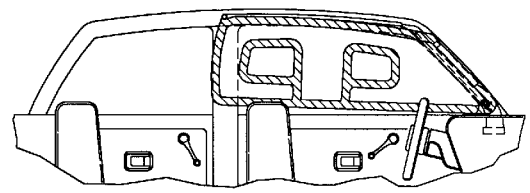
Figure 18E:
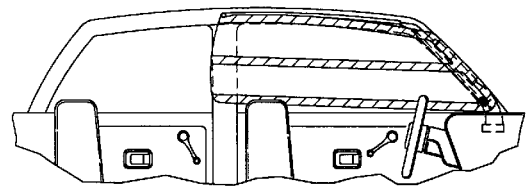
Figure 18F:
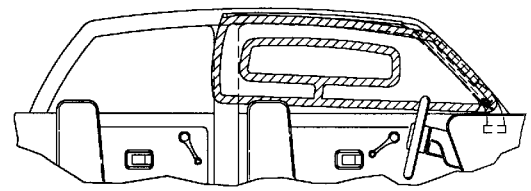
Figure 18G:
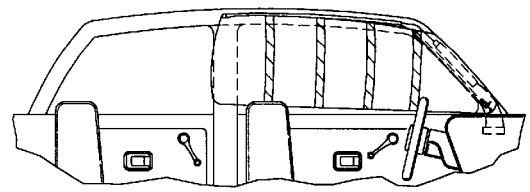
Figure 18H:
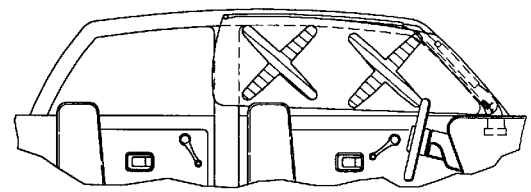
Figure 18I:
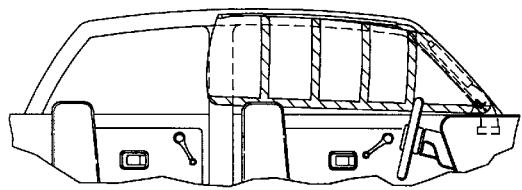
Figure 18J:
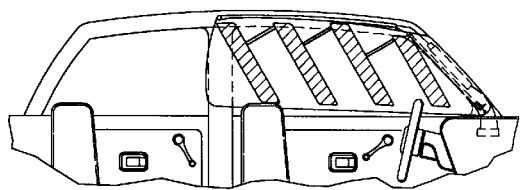
Figure 18K:
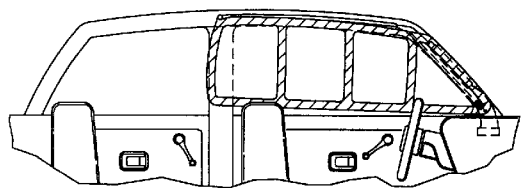
Figure 18L:
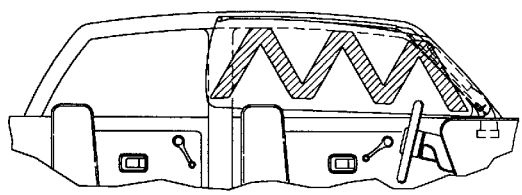
Figure 18M:
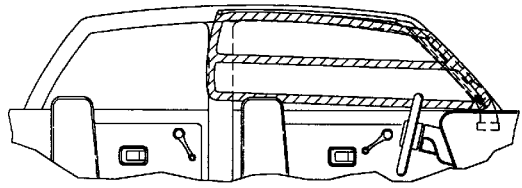
Figure 18N:
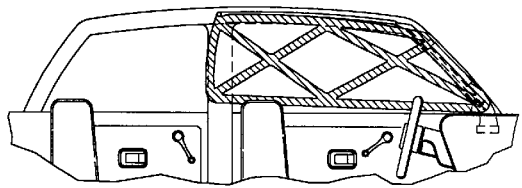

FIG. 17 shows the curtain of FIG. 16 looking in the direction of arrow XVII in FIG. 16. It can be seen from FIG. 17 that the conical tube 140 and tube 138 (not shown) holds the curtain 132 clear from the seat belt 144.

The embodiment of FIGS. 16 and 17 is advantageous since it avoids interference with the seat belt, which may knock the seat belt off the shoulder of the wearer in a crash.

FIG. 18 shows a number of configurations of inflatable curtain 14 with various internal arrangements of tubing. The hatched portions show the areas inflated in the event of a crash. The tubing may be in fluid communication with the remainder of the curtain whereby the gas generator inflates the tubular arrangement and then the gas in the tubes leaks out to the remainder of the curtain to inflate the remainder. Alternatively, the tubular arrangement could be sealed so that just the tubes are inflated.

The restraints described above for are especially useful as side impact restraints as the invention provides a method of deploying a large restraint quickly within the time scale afforded by a side impact.

We claim:

1. An inflatable restraint for a vehicle occupant comprising an inflatable curtain and a deployment member for moving the curtain into an occupant protection position wherein the deployment member is a resilient member which is held in an extended state under tension by a solenoid operated latch when the inflatable curtain is in an un-deployed state and the tension on the deployment member is released to deploy the inflatable curtain, said solenoid is operable by means of a pressure sensor connected to inflating means for inflating the inflatable curtain.

2. The inflatable restraint of claim 1 having more than one deployment member.

3. An inflatable restraint of claim 2 wherein the deployment members are connected by structural members to provide structural rigidity to the curtain upon deployment thereof.

4. The inflatable restraint of claim 1 wherein the curtain has strengthening ribs.

5. The inflatable restraint of claim 1 wherein the curtain has inflatable tubes which are inflatable before the remainder of the curtain.

6. An inflatable restraint of claim 1 wherein the curtain has an inflatable guide member for directing the curtain away from an obstruction in a vehicle.

7. A vehicle having installed therein an inflatable restraint for a vehicle occupant comprising an inflatable curtain and a deployment member for moving the curtain into an occupant protection position wherein the deployment member is a resilient member which is held in an extended state under tension by a solenoid operated latch when the inflatable curtain is in an un-deployed state and the tension on the deployment member is released to deploy the inflatable curtain, said solenoid is operable by means of a pressure sensor connected to inflating means for inflating the inflatable curtain.

8. A vehicle according to claim 7 in which the inflatable curtain is located along one whole side of the interior of the vehicle.

9. A vehicle according to claim 7 in which one inflatable restraint is located at the front on one side of the interior of the vehicle and a second curtain is located at the rear on said side of the interior of the vehicle.

10. A vehicle according to claim 7 in which the inflatable curtain is located in a slot in a roof rail of the vehicle.

11. A vehicle according to claim 7 in which the inflatable curtain is located in a slot in a door pillar of the vehicle.

12. A vehicle according to claim 7 in which the inflatable curtain is located in a slot in a roof rail of the vehicle and in a slot in a door pillar of the vehicle.

* * * * *